No. 645,388. Patented Mar. 13, 1900.
A. B. DISS.
CASTER.
(Application filed Aug. 12, 1899.)
(No Model.)

Witnesses
Chas. H. Smith
J. Staib

Inventor
Albert B. Diss
per L. W. Serrell & Son
attys

THE NORRIS PETERS CO., PHOTO-LITHO., WASHINGTON, D. C.

UNITED STATES PATENT OFFICE.

ALBERT B. DISS, OF NEW YORK, N. Y.

CASTER.

SPECIFICATION forming part of Letters Patent No. 645,388, dated March 13, 1900.

Application filed August 12, 1899. Serial No. 726,956. (No model.)

*To all whom it may concern:*

Be it known that I, ALBERT B. DISS, a citizen of the United States, residing at New York, borough of Brooklyn, in the county of Kings and State of New York, have invented an Improvement in Casters, of which the following is a specification.

In modern furniture-casters antifriction or ball bearings are desirable; yet simplicity of construction and cheapness in the manufacture are required, all superfluous and unnecessary parts or features are usually eliminated, and the balls run on flat surfaces. It is therefore necessary to provide a device for holding the balls in a group or, in other words, in their proper relation to one another.

My invention relates to a cage-plate for holding the group of balls of the antifriction-bearing and retaining them in place, so that the balls rotate freely and maintain their relation to one another and to the parts of the caster. This cage-plate I cut out of sheet metal, and the same comprises a flat ring with integral radial inturned arms, which act as pivots or axes for receiving the hollow balls or rollers and on which the same turn, bearing upon the upper surface of the jaw-top of the caster-wheel and the under side of the supporting-disk pierced by the pintle. This forms a cheap and very efficient device for holding balls or rollers and maintaining them in their proper position and relation.

Figure 1:
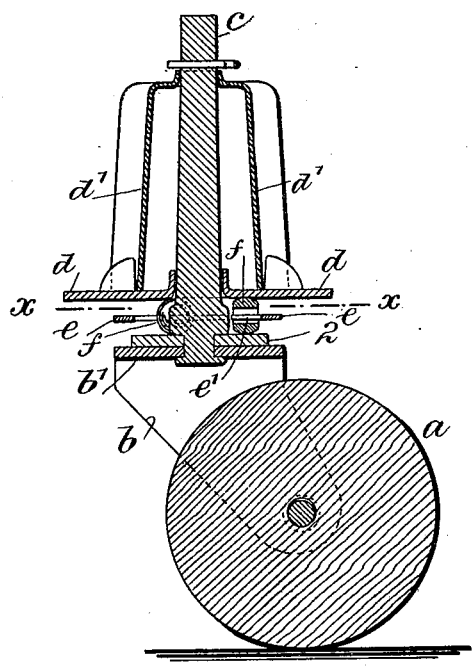
Figure 3:
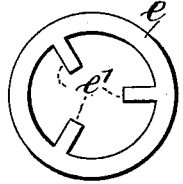
Figure 2:
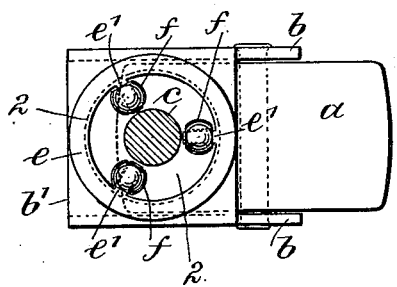

In the drawings, Figure 1 is a vertical section representing my improvement. Fig. 2 is a sectional plan at *x x* of Fig. 1, and Fig. 3 is a detached view of the cage-plate alone.

The caster-wheel *a*, the jaws *b*, and the jaw-top *b'*, as well as the pintle *c*, are of usual construction, and I prefer to employ a disk 2 above the jaw-top, and to which, as well as the jaw-top, the pintle is securely riveted, the said disk forming a hard flat surface, upon which the antifriction-balls travel. The supporting-disk *d* surrounds the pintle and comes at the base of the tubular or other furniture leg. The spring-frame *d'* is shown as surrounding the pintle for the purpose of illustration; but the same forms no part whatever of the present invention.

The cage-plate comprises the ring *e* and the integral radial inturned arms *e'*. This is preferably stamped out of sheet metal, and while three arms are shown as a minimum number more than three might be employed with very large casters. The rollers or balls *f* are pierced with an opening of sufficient size to freely pass upon the radial arms *e'*, which arms act as pivots or axes for the said hollow balls. These hollow balls are threaded from within the ring *e* upon the said arms, and the said ring, with the balls, fits over the pintle, the points of the arms, as will be seen from Figs. 1 and 2, almost touching the surface of the pintle, so that when the ring, with the balls in place, is passed over the pintle there is no lateral play and no possibility of the balls coming off the said arms. The balls bear upon the disk 2 and upon the under side of the supporting-disk *d* and carry the weight resting upon the disk *d*, transferring the same to the caster-wheel.

I claim as my invention—

1. The combination with the caster-wheel, the jaws and pintle and the disk surrounding the pintle and upon which the caster-leg rests, of a cage-plate comprising a ring with integral radial inturned arms, and the hollow balls upon said arms and to which said arms become pivots or axes, substantially as set forth.

2. The combination with the caster-wheel, the jaws and pintle and the disk surrounding the pintle and upon which the caster-leg rests and the disk 2 above the jaw-top, of a cage-plate stamped out from sheet metal and comprising a flat ring with integral radial inturned arms in the same plane, the points of the said arms being adjacent when the ring is in place to the surface of the pintle, the hollow balls passed over the said arms and to which the said arms become pivots or axes, the balls bearing upon the upper surface of the disk 2 and the under surface of the disk surrounding the pintle and upon which the caster-leg rests, substantially as set forth.

Signed by me this 11th day of August, 1899.

ALBERT B. DISS.

Witnesses:
GEO. T. PINCKNEY,
S. T. HAVILAND.